(12) United States Patent
Crisan et al.

(10) Patent No.: US 9,407,560 B2
(45) Date of Patent: Aug. 2, 2016

(54) SOFTWARE DEFINED NETWORK-BASED LOAD BALANCING FOR PHYSICAL AND VIRTUAL NETWORKS

(71) Applicant: International Business Machines Corporation, Armonk, NY (US)

(72) Inventors: Daniel Crisan, Zug (CH); Casimer DeCusatis, Poughkeepsie, NY (US); Mitch Gusat, Langnau am Albis (CH); Cyriel Minkenberg, Gutenswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 252 days.

(21) Appl. No.: 13/834,117

(22) Filed: Mar. 15, 2013

(65) Prior Publication Data

US 2014/0269288 A1    Sep. 18, 2014

(51) Int. Cl.
| | |
|---|---|
| H04L 12/851 | (2013.01) |
| H04L 12/801 | (2013.01) |
| H04L 12/803 | (2013.01) |
| H04L 12/24 | (2006.01) |

(52) U.S. Cl.
CPC ......... *H04L 47/2425* (2013.01); *H04L 12/2472* (2013.01); *H04L 41/5019* (2013.01); *H04L 41/5022* (2013.01); *H04L 41/5025* (2013.01); *H04L 47/11* (2013.01); *H04L 47/115* (2013.01); *H04L 47/12* (2013.01); *H04L 47/122* (2013.01); *H04L 47/125* (2013.01)

(58) Field of Classification Search
None
See application file for complete search history.

(56) References Cited

U.S. PATENT DOCUMENTS

| | | | |
|---|---|---|---|
| 5,694,390 A | 12/1997 | Yamato | |
| 5,905,711 A | 5/1999 | Chiussi | |

(Continued)

FOREIGN PATENT DOCUMENTS

| | | |
|---|---|---|
| CN | 101313278 A | 11/2008 |
| CN | 101398770 A | 4/2009 |

(Continued)

OTHER PUBLICATIONS

Notification of Transmittal of the International Search Report and the Written Opinion of the International Searching Authority, or the Declaration; PCT/IB2014/059457; Mailed Jul. 1, 2014, 6 pages.

(Continued)

*Primary Examiner* — Andrew Oh
(74) *Attorney, Agent, or Firm* — Cantor Colburn LLP; Steven Chiu

(57) ABSTRACT

A method of monitoring transmission of data in a network is provided. The method includes: receiving data packets for one or more data flows by at least one of a plurality of network switches; sampling queue data in each of the plurality of network switches, the sampled queue data taken from at least one queue attached to a switch port to which the one or more data packets have been forwarded; and transmitting the sampled queue data to a logically centralized network controller connected to the plurality of switches, the network controller configured to control the plurality of network switches, the network controller configured to determine whether a congestion, unfairness or Service Level Agreement (SLA) infringement condition exists in one or more switches based on the sampled queue data and send a control message to one or more data flow sources based on the congestion, unfairness or SLA infringement condition.

25 Claims, 5 Drawing Sheets

(56) References Cited

U.S. PATENT DOCUMENTS

| | | | |
|---|---|---|---|
| 5,966,546 A | 10/1999 | Thomas | |
| 6,094,418 A * | 7/2000 | Soumiya | H04L 12/5602 370/231 |
| 6,208,619 B1 | 3/2001 | Takeuchi | |
| 6,356,944 B1 | 3/2002 | McCarty | |
| 6,504,818 B1 * | 1/2003 | Levine | 370/229 |
| 6,504,821 B2 | 1/2003 | Berger | |
| 6,795,399 B1 * | 9/2004 | Benmohamed | H04L 47/10 370/235 |
| 6,813,246 B1 * | 11/2004 | Phan | H04Q 3/66 370/238 |
| 6,947,380 B1 | 9/2005 | Yip et al. | |
| 6,975,592 B1 | 12/2005 | Seddigh | |
| 7,187,652 B2 | 3/2007 | Lee et al. | |
| 7,234,073 B1 | 6/2007 | Roytman et al. | |
| 7,289,453 B2 | 10/2007 | Riedel et al. | |
| 7,408,876 B1 | 8/2008 | Gupta | |
| 7,765,328 B2 * | 7/2010 | Bryers | H04L 29/06 709/220 |
| 7,949,893 B1 | 5/2011 | Knaus et al. | |
| 7,978,607 B1 * | 7/2011 | Halabi | H04L 47/263 370/229 |
| 8,069,139 B2 | 11/2011 | Garbow et al. | |
| 8,082,466 B2 | 12/2011 | Tanaka et al. | |
| 8,429,282 B1 | 4/2013 | Ahuja | |
| 8,630,307 B2 * | 1/2014 | Wu | H04W 28/0289 370/235 |
| 8,724,470 B2 | 5/2014 | Yi et al. | |
| 8,762,501 B2 | 6/2014 | Kempf | |
| 8,953,453 B1 | 2/2015 | Xiao et al. | |
| 2001/0056459 A1 | 12/2001 | Kurose | |
| 2002/0073354 A1 | 6/2002 | Schroiff et al. | |
| 2002/0159386 A1 * | 10/2002 | Grosdidier | H04L 12/2602 370/229 |
| 2002/0196749 A1 | 12/2002 | Eyuboglu et al. | |
| 2003/0051187 A1 | 3/2003 | Mashayekhi et al. | |
| 2004/0153866 A1 | 8/2004 | Guimbellot et al. | |
| 2004/0170123 A1 * | 9/2004 | Carpenter | H04L 63/1458 370/229 |
| 2004/0179476 A1 | 9/2004 | Kim et al. | |
| 2004/0228278 A1 * | 11/2004 | Bruckman | H04L 47/10 370/231 |
| 2006/0126509 A1 | 6/2006 | Abi-Nassif et al. | |
| 2006/0187874 A1 | 8/2006 | Zaki | |
| 2006/0203828 A1 | 9/2006 | Kumazawa | |
| 2006/0209695 A1 | 9/2006 | Archer et al. | |
| 2006/0215550 A1 | 9/2006 | Malhotra | |
| 2007/0081454 A1 * | 4/2007 | Bergamasco | H04L 47/10 370/229 |
| 2007/0183332 A1 | 8/2007 | Oh | |
| 2007/0204266 A1 | 8/2007 | Beaty et al. | |
| 2007/0220121 A1 | 9/2007 | Suwarna | |
| 2007/0263540 A1 * | 11/2007 | Charzinski | H04L 12/5695 370/232 |
| 2008/0137669 A1 | 6/2008 | Balandina et al. | |
| 2008/0192752 A1 | 8/2008 | Hyslop et al. | |
| 2008/0225713 A1 * | 9/2008 | Tychon | H04L 45/125 370/231 |
| 2008/0298248 A1 * | 12/2008 | Roeck | H04L 47/10 370/237 |
| 2009/0052326 A1 * | 2/2009 | Bergamasco | H04L 47/10 370/236 |
| 2009/0089609 A1 | 4/2009 | Baba | |
| 2009/0092046 A1 | 4/2009 | Naven | |
| 2009/0180380 A1 * | 7/2009 | Prabhakar | H04L 47/10 370/232 |
| 2009/0203350 A1 | 8/2009 | Gottlieb | |
| 2009/0213861 A1 | 8/2009 | Benner et al. | |
| 2009/0231997 A1 * | 9/2009 | Yang | H04M 1/72522 370/229 |
| 2009/0232001 A1 * | 9/2009 | Gong et al. | 370/236 |
| 2009/0268614 A1 | 10/2009 | Tay | |
| 2010/0014487 A1 | 1/2010 | Attar et al. | |
| 2010/0027420 A1 | 2/2010 | Smith | |
| 2010/0027424 A1 * | 2/2010 | Radunovic | H04W 40/04 370/238 |
| 2010/0138686 A1 | 6/2010 | Arata et al. | |
| 2010/0142539 A1 | 6/2010 | Gooch | |
| 2010/0146327 A1 | 6/2010 | Takubo | |
| 2010/0166424 A1 | 7/2010 | Nagarajan et al. | |
| 2010/0211718 A1 | 8/2010 | Gratz | |
| 2010/0214970 A1 | 8/2010 | Brunner et al. | |
| 2010/0238803 A1 * | 9/2010 | Racz | H04L 47/10 370/235 |
| 2010/0238805 A1 * | 9/2010 | Ludwig et al. | 370/236 |
| 2010/0281178 A1 | 11/2010 | Sullivan | |
| 2010/0302935 A1 * | 12/2010 | Zhang et al. | 370/218 |
| 2010/0303238 A1 | 12/2010 | Cakulev | |
| 2010/0309781 A1 * | 12/2010 | Wang | H04B 7/0871 370/229 |
| 2011/0026437 A1 | 2/2011 | Roja-Cessa et al. | |
| 2011/0031082 A1 | 2/2011 | Chi | |
| 2011/0032821 A1 | 2/2011 | Morrill et al. | |
| 2011/0085444 A1 | 4/2011 | Ko et al. | |
| 2011/0090797 A1 | 4/2011 | Beecroft | |
| 2011/0135305 A1 | 6/2011 | Barnard | |
| 2011/0137772 A1 * | 6/2011 | Davis, III | G06Q 30/016 705/34 |
| 2011/0142450 A1 | 6/2011 | Tanzi et al. | |
| 2011/0158647 A1 | 6/2011 | Solheim et al. | |
| 2011/0158658 A1 | 6/2011 | Myslinski et al. | |
| 2011/0179415 A1 | 7/2011 | Donnellan et al. | |
| 2011/0206025 A1 | 8/2011 | Cadenas | |
| 2011/0211834 A1 | 9/2011 | Ansari et al. | |
| 2011/0242966 A1 | 10/2011 | Van Caenegem | |
| 2011/0256865 A1 | 10/2011 | Sayeed | |
| 2011/0261696 A1 | 10/2011 | Crisan et al. | |
| 2011/0261831 A1 | 10/2011 | Sharma et al. | |
| 2011/0271007 A1 | 11/2011 | Wang et al. | |
| 2011/0273988 A1 | 11/2011 | Tourrilhes et al. | |
| 2011/0283016 A1 | 11/2011 | Uchida | |
| 2011/0286324 A1 | 11/2011 | Bellagamba et al. | |
| 2011/0292830 A1 | 12/2011 | Yanggratoke et al. | |
| 2011/0295996 A1 | 12/2011 | Qiu | |
| 2011/0299389 A1 | 12/2011 | Mau et al. | |
| 2011/0305167 A1 | 12/2011 | Koide | |
| 2011/0305288 A1 | 12/2011 | Liu et al. | |
| 2012/0008958 A1 | 1/2012 | Dahlfort et al. | |
| 2012/0014284 A1 | 1/2012 | Ranganathan et al. | |
| 2012/0014693 A1 | 1/2012 | Cheng et al. | |
| 2012/0020361 A1 | 1/2012 | Ueno | |
| 2012/0023231 A1 | 1/2012 | Ueno | |
| 2012/0030306 A1 | 2/2012 | Kami | |
| 2012/0054079 A1 | 3/2012 | Hayashi | |
| 2012/0063316 A1 * | 3/2012 | Ghanwani | H04L 47/10 370/235 |
| 2012/0163175 A1 * | 6/2012 | Gupta | H04L 47/10 370/235 |
| 2012/0170477 A1 | 7/2012 | Hieda | |
| 2012/0195201 A1 | 8/2012 | Ishikawa | |
| 2012/0201140 A1 | 8/2012 | Suzuki | |
| 2012/0207175 A1 | 8/2012 | Raman et al. | |
| 2012/0221887 A1 | 8/2012 | Hansson et al. | |
| 2012/0243476 A1 | 9/2012 | Eyuboglu | |
| 2012/0250496 A1 | 10/2012 | Kato | |
| 2012/0287782 A1 * | 11/2012 | Lv et al. | 370/230 |
| 2013/0003735 A1 | 1/2013 | Chao | |
| 2013/0010600 A1 | 1/2013 | Jocha et al. | |
| 2013/0054761 A1 | 2/2013 | Kempf et al. | |
| 2013/0058345 A1 | 3/2013 | Kano | |
| 2013/0124683 A1 | 5/2013 | Watanabe | |
| 2013/0144995 A1 | 6/2013 | Ishii | |
| 2013/0159415 A1 * | 6/2013 | Kamiya | H04L 47/11 709/204 |
| 2013/0162038 A1 | 6/2013 | Falk | H02J 3/14 307/26 |
| 2013/0176850 A1 | 7/2013 | Mishra | |
| 2013/0205002 A1 * | 8/2013 | Wang | H04L 69/16 709/224 |
| 2013/0212578 A1 * | 8/2013 | Garg | H04L 43/0882 718/1 |
| 2013/0250770 A1 | 9/2013 | Zou et al. | |
| 2013/0258843 A1 * | 10/2013 | Kurita | 370/229 |

(56) References Cited

U.S. PATENT DOCUMENTS

| | | | |
|---|---|---|---|
| 2013/0258847 | A1 | 10/2013 | Zhang et al. |
| 2013/0266317 | A1 | 10/2013 | Wang |
| 2013/0268686 | A1 | 10/2013 | Wang et al. |
| 2013/0294236 | A1* | 11/2013 | Beheshti-Zavareh et al. ............................ 370/235 |
| 2014/0006630 | A1 | 1/2014 | Cai |
| 2014/0010235 | A1 | 1/2014 | Ueno |
| 2014/0016476 | A1 | 1/2014 | Dietz |
| 2014/0016647 | A1 | 1/2014 | Yoshida et al. |
| 2014/0040526 | A1 | 2/2014 | Chang et al. |
| 2014/0092907 | A1 | 4/2014 | Sridhar et al. |
| 2014/0108632 | A1 | 4/2014 | Narasimha |
| 2014/0119193 | A1* | 5/2014 | Anand et al. .................. 370/237 |
| 2014/0126907 | A1 | 5/2014 | Hirth et al. |
| 2014/0146681 | A1* | 5/2014 | Gusavec ........... H04W 28/0284 370/237 |
| 2014/0169189 | A1 | 6/2014 | Kalunnte |
| 2014/0178066 | A1 | 6/2014 | Patel et al. |
| 2014/0192646 | A1 | 7/2014 | Mir |
| 2014/0258774 | A1 | 9/2014 | Taylor et al. |
| 2014/0301204 | A1 | 10/2014 | Koshimizu |

FOREIGN PATENT DOCUMENTS

| | | |
|---|---|---|
| CN | 101677321 A | 3/2010 |
| CN | 101997644 A | 3/2011 |
| CN | 102291389 A | 12/2011 |
| EP | 0876023 | 11/1998 |
| GB | 2313268 A | 5/1996 |
| JP | 2011166700 A | 8/2011 |
| WO | 9930462 | 6/1999 |
| WO | 2009113106 A2 | 9/2009 |
| WO | 2011037104 A1 | 9/2010 |
| WO | 2011037148 A1 | 3/2011 |
| WO | 2011065268 A1 | 3/2011 |
| WO | 2011118575 A1 | 9/2011 |
| WO | 2012056816 A1 | 5/2012 |

OTHER PUBLICATIONS

PCT Notification of Transmittal of the International Search Report and the Written Opinion of the International Searching Authority, or the Declaration, Application No. PCT/IB2014/059460; International Filing Date: Mar. 5, 2014; Date of Mailing: Jun. 30, 2014; 9 pages.
PCT Notification of Transmittal of the International Search Report and the Written Opinion of the International Searching Authority, or the Declaration, Application No. PCT/IB2014/059459; International Filing Date: Mar. 5, 2014; Date of Mailing: Jun. 30, 2014; 10 pages.
Curtis, et al "DevoFlow: Scaling Flow Management for High-Performance Netowrks". SIGCOMM'11, Aug. 15-19, 2011, Toronto, Ontario, Canada.
Egilmez, et al. "Scalable video streaming over OpenFlow networks: An optimization framework for QoS Routing". 2011 18th IEEE International Confernece on Image Processing (ICIP), 2241-2244.
El-Azzab, et al. "Slices isolator for a virtualized openflow node", (2011) First International Symposium on Network Cloud Computing and Applications (NCCA), 121-126.
Li, Z., et al. Compatib le TDM/WDM PON using a Single Tunable Optical Filter for both Downstream Wavelength Selection and Upstream Wavelength Generation. IEEE Photonics Technology Letters, vol. 24, No. 10, May 15, 2012. pp. 797-799.
Liu, et al. "Open Flow-based Wavelength Path Control in Transparent Optical networks: a Proof-of-Concept Demonstration" Sep. 2011, 37th European conference and Exhibition on Optical communication (ECOC).
McKeown et al., "OpenFlow: Enabling Innovation in Campus Networks", Mar. 14, 2008, 6 pages.
McKeown, et al. "OpenFlow: Enabling Innovation in Campus Networks". ACM SIGCOMM Computer Communication Review, 38(2), 69-74.
Johnson, RD.et al.; "Detection of a Working Master Controller by a Slave Card"; http://www.ip.com/pubview/IPCOM000099594D; Feb. 1, 1990, 3 pages.
IBM "Software Defined Networking, A new paradigm for virtual dynamic, flexible networking," IBM Systems and Technology, Oct. 2012, 6 pages.
Anonymous; "Intelligent VM Migration Based on Relative VM Priority and Relative Suitability of Migration Target"; http://priorartdatabase.com/IPCOM/000201632; Nov. 16, 2010, 3 pages.
Anonymous; "Management framework for efficient live migration of virtual machines running migration-aware applications";http://priorartdatabase.com/IPCOM000200260; Oct. 3, 2010, 5 pages.
Pfaff, B.et al.; "Open Flow Switch Specification"; www.openflow.org/document/openflow_spec_v1.0.0.pdf; Feb. 28, 2011, 56 pages.
IBM; "The automatic determination of master-slave relationship between embedded controllers by mearns of a shared hardware access switch"; http://www.ip.com/pubview/IPCOM000020741D; Dec. 11, 2003, 5 pages.
Wang et al., "Dynamic Bandwidth Allocation for Preventing Congestion in Data Center Networks," ISNN 2011, Part III, LNCS 6677, pp. 160-167, 2011.
Yong, S. et al, "XOR Retransmission in Multicast Error Recovery". Networks, 2000 (ICON2000). Proceedings. IEEE International Conference. pp. 336-340.
U.S. Appl. No. 13/833,886; Non-Final Office Action; filed Mar. 15, 2013; Date Mailed: Dec. 17, 2014; 32 pages.
U.S. Appl. No. 13/833,796; Non-final Office Action ; filed Mar. 15, 2013; Date Mailed: Dec. 19, 2014; 31pages.
U.S. Appl. No. 13/833,886; Final Office Action; filed Mar. 15, 2013; Date Mailed: Apr. 9, 2015; 19 pages.
U.S. Appl. No. 13/833,952, Final Office Action; filed Mar. 15, 2013; Date Mailed: Apr. 16, 2015; 25 pages.
U.S. Appl. No. 13/833,952; Non-FinalOffice Action; filed Mar. 15, 2013; Date Mailed: Nov. 3, 2014; 39 pages.
U.S. Appl. No. 13/834,502; Non-Final Office Action; filed Mar. 15, 2013; Date Mailed: Dec. 4, 2014; 37 pages.
U.S. Appl. No. 14/501,457, Non-Final Office Action; filed Sep. 30, 2014; Date Mailed: Mar. 18, 2015; 29 pages.
U.S. Appl. No. 14/501,663, filed Sep. 30, 2014; Final Office Action; Date Mailed: Apr. 9, 2015; 25 pages.
U.S. Appl. No. 14/501,663; Non-Final Office Action; filed Sep. 30, 2014; Date Mailed: Dec. 19, 2014; 11 pages.
U.S. Appl. No. 14/501,945; Non-Final Office Action, filed Sep. 30, 2014; Date Mailed: Jan. 5, 2015; 29 pages.
U.S. Appl. No. 14/502,043; Non-Final Office Action; filed Sep. 30, 2014; Date Mailed: Dec. 23, 2014; 17 pages.
U.S. Appl. No. 13/833,886, filed Mar. 15, 2013; Non-Final Office Action, Date Mailed: Aug. 3, 2015; 18 pages.
U.S. Appl. No. 13/833,952; Non-Final Office Action, filed Mar. 15, 2013; Date Mailed: Aug. 5, 2015; 25 pages.
U.S. Appl. No. 13/834,502; Final Office Action; filed Mar. 15, 2013; Date Mailed: Jun. 29, 2015; 26 pages.
U.S. Appl. No. 14/501,457; Final Office Action; filed Sep. 30, 2014; Date Mailed: Jun. 29, 2015; 28 pages.
U.S. Appl. No. 14/501,945; Final Office Action: filed Sep. 30, 2014; Date Mailed: Jul. 16, 2015; 30 pages.
U.S. Appl. No. 13/833,796, filed Mar. 15, 2013; Non-Final Office Action; Date Mailed: Jul. 30, 2015, 21 pages.
U.S. Appl. No. 13/833,796, filed Mar. 15, 2013; Final office action; Date Mailed: Jan. 15, 2016; 18 pages.
U.S. Appl. No. 14/501,663, filed Sep. 30, 2014; Final office action; Date Mailed: Jan. 20, 2016; 15 pages.
U.S. Appl. No. 14/501,945; Non-final Office Action; filed Sep. 30, 21014; Date Mailed: Nov. 30, 2015; 22 pages.

* cited by examiner

SOFTWARE DEFINED NETWORK-BASED LOAD BALANCING FOR PHYSICAL AND VIRTUAL NETWORKS

BACKGROUND

Embodiments herein relate to computer networks and, more specifically, to control of network switches in a computer network.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

In an OpenFlow network environment, switches are connected via secure links to respective controllers, in order to control switch configuration and routing. Such controllers typically provide such control via control data packets sent over the secure link, which maintain higher levels of data integrity than conventional Ethernet fabrics.

Typically, when data packets are forwarded by a switch through a specified port, the packets are queued in a switch buffer when there is an imbalance between incoming and outgoing packet rates. Network congestion is a problem that occurs when the switch carries so much data that buffer queue entries are exhausted or buffers are filled to some level relative to the buffer size. Such congestion results in a reduction of quality of service, causing packets to be dropped, or queuing and/or transmission of packets to be delayed.

SUMMARY

An embodiment includes a method of monitoring transmission of data in a network. The method includes: receiving data packets for one or more data flows by at least one of a plurality of network switches; sampling queue data in each of the plurality of network switches receiving the one or more data packets, the sampled queue data taken from at least one queue attached to a switch port to which the one or more data packets have been forwarded; and transmitting the sampled queue data to a logically centralized network controller connected to the plurality of switches, the network controller configured to control the plurality of network switches, the network controller configured to determine whether a congestion, unfairness or Service Level Agreement (SLA) infringement condition exists in one or more switches based on the sampled queue data and send a control message to one or more data flow sources based on the congestion, unfairness or SLA infringement condition.

Another embodiment includes a method of monitoring transmission of data in a network. The method includes: receiving, by a centralized network controller, sampled queue data from each of a plurality of network switches, the network controller configured to control the plurality of network switches, the sampled queue data taken from at least one queue attached to a switch port to which one or more data packets of a data flow have been forwarded; determining, by the network controller, whether a congestion, unfairness or Service Level Agreement (SLA) infringement condition exists in one or more network switches for one or more data flows based on the sampled queue data; and based on determining that a congestion, unfairness or SLA infringement condition exists for the one or more data flows, sending a control message to at least one source of the one or more data flows to reduce an amount of congestion, unfairness or SLA non-compliance in the network switch.

Yet another embodiment includes an apparatus for controlling a plurality of switches in a network. The apparatus includes a memory having computer readable computer instructions and a processor for executing the computer readable instructions. The instructions are for: receiving sampled queue data from each of a plurality of network switches, the sampled queue data taken from at least one queue attached to a switch port to which one or more data packets of a data flow have been forwarded; determining whether a congestion, unfairness or Service Level Agreement (SLA) infringement condition exists in one or more network switches for one or more data flows based on the sampled queue data; and based on determining that a congestion, unfairness or SLA infringement condition exists for the one or more data flows, sending a control message to at least one source of the one or more data flows to reduce an amount of congestion, unfairness or SLA non-compliance in the network.

A further embodiment includes a computer program product for monitoring transmission of data in a network. The computer program product includes a tangible storage medium readable by a processing circuit and storing instructions for execution by the processing circuit for performing a method including: receiving sampled queue data from each of a plurality of network switches at a centralized network controller configured to control the plurality of network switches, the sampled queue data taken from at least one queue attached to a switch port to which one or more data packets of a data flow have been forwarded; determining whether a congestion, unfairness or Service Level Agreement (SLA) infringement condition exists in one or more network switches for one or more data flows based on the sampled queue data; and based on determining that a congestion, unfairness or SLA infringement condition exists for the one or more data flows, sending a control message to at least one source of the one or more data flows to reduce an amount of congestion, unfairness or SLA non-compliance in the one or more network switches.

A still further embodiment includes a computer program product for monitoring transmission of data in a network. The computer program product includes a tangible storage medium readable by a processing circuit and storing instructions for execution by the processing circuit for performing a method including: receiving data packets for one or more data flows by at least one of a plurality of network switches; sampling queue data in each of the plurality of network switches receiving the one or more data flows, the sampled queue data taken from at least one queue attached to a switch port to which the one or more data packets have been forwarded; and transmitting the sampled queue data to a centralized network controller connected to the plurality of switches, the network controller configured to control the plurality of network switches, the network controller configured to determine whether a congestion, unfairness or Service Level Agreement (SLA) infringement condition exists in one or more switches based on the sampled queue data and send a control message to one or more data flow sources based on the congestion, unfairness or SLA infringement condition.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to monitoring switches in a network by a centralized network controller. An embodiment of a network includes a plurality of switches, all or some of which are connected to a network controller configured to control the switch. In one embodiment, the controller receives samples of queue data from queues in one or more network switches to which the controller is connected. The controller may analyze or inspect the queue data samples to determine whether a port and/or switch is congested or will become congested. If it is determined that the port and/or switch is or will be congested, the controller may take remedial action, such as by sending control messages to agents or entities (e.g., traffic sources such as network interface controllers or network entities such as switches) for rate-limiting the data flow assigned to the switch or re-routing the data flow to a less congested switch. In one embodiment, the controller is configured to determine a congestion level of the switch and/or port based on queue depth or rate of change of the queue depth.

An embodiment of a method includes generating and sending sample packets from a plurality of network entities to a centralized load manager. The load manager is configured to aggregate the sample packets and calculate a global control message that may be sent to all sources of data flows contributing to one or more congestion events, to provide for global load balancing and congestion control.

Figure 1:
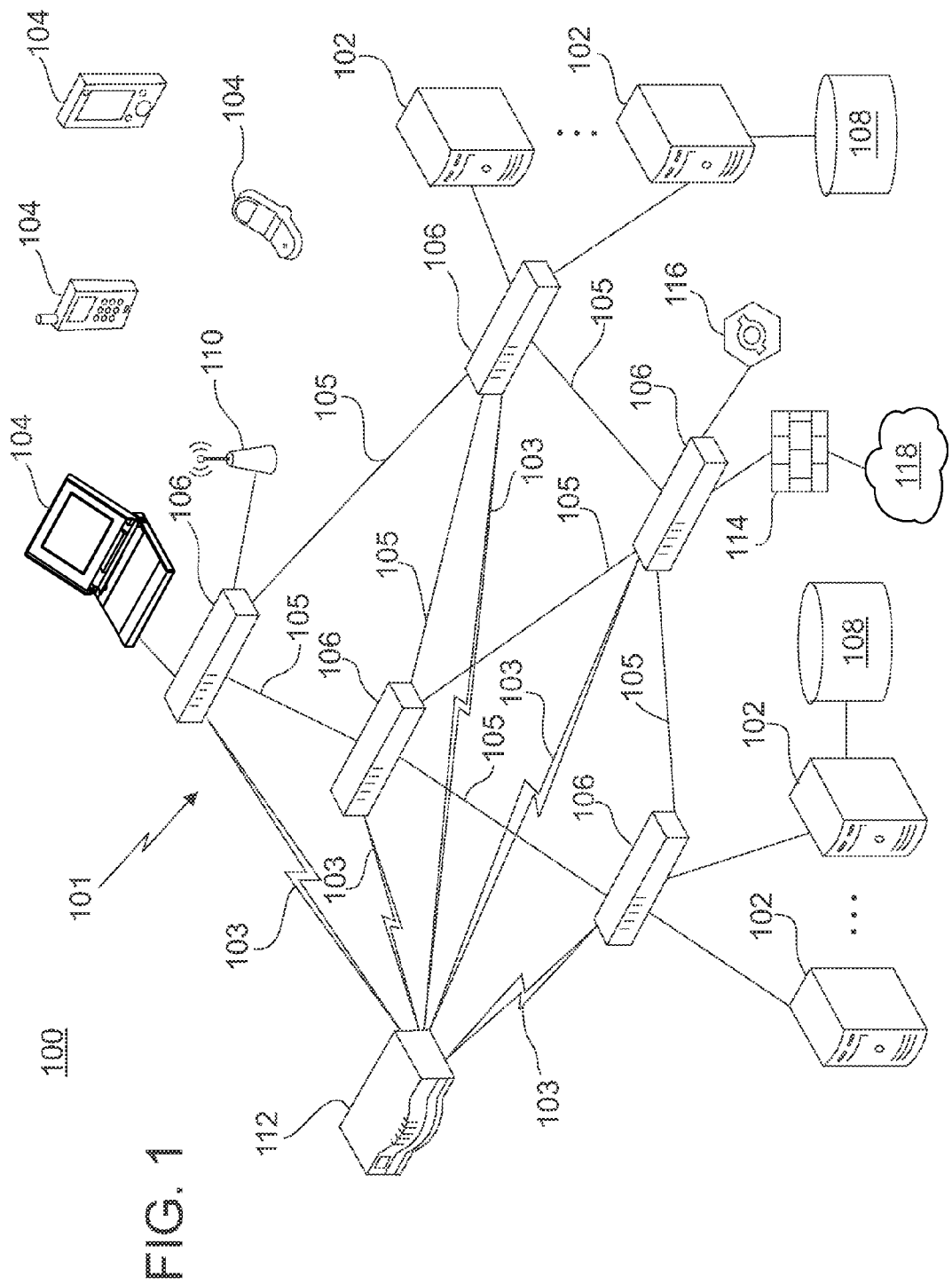
FIG. 1 depicts a block diagram of a system including a network with OpenFlow-capable switches that may be implemented according to an embodiment.

Turning now to FIG. 1, an example of a system 100 including a network 101 that supports OpenFlow will now be described in greater detail. In the example depicted in FIG. 1, the system 100 is a data center environment including a plurality of servers 102 and client systems 104 configured to communicate over the network 101 using switches 106 that are OpenFlow-capable. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108.

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may include one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes a network controller 112 that is a central Software Defined Network (SDN) controller configured to make routing decisions within the network 101. The network controller 112 establishes one or more secure links 103 to configure the switches 106 and establish communication properties of links 105 between the switches 106. For example, the network controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controller 112 can include various computer/communication hardware and software technology known in the art, such as one or more processing units or circuits, volatile and non-volatile memory including removable media, power supplies, network interfaces, support circuitry, operating systems, and the like. Although the network controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controller 112, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports OpenFlow as a layer-2 protocol. The switches 106 can be dedicated OpenFlow switches or OpenFlow-enabled general purpose switches that also support layer-2 (for example Ethernet) and layer-3 (for example Internet Protocol (IP)).

Figure 2:
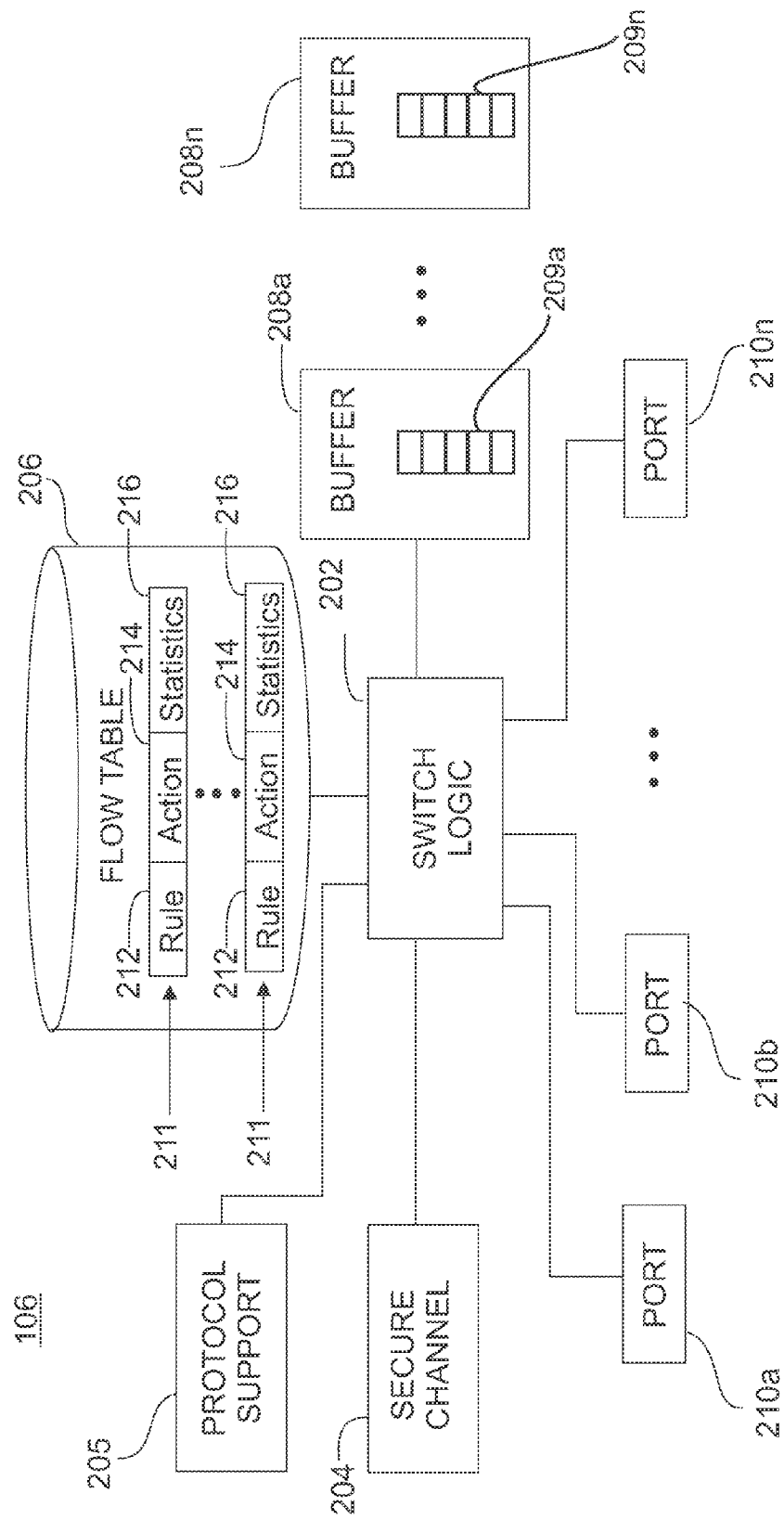
FIG. 2 depicts a block diagram of an OpenFlow-capable switch according to an embodiment.

FIG. 2 depicts a block diagram of the switch 106 of FIG. 1 that supports OpenFlow. The switch 106 includes switch logic 202, secure channel 204, protocol support 205, flow table 206, input/output buffers 208a-208n, port queues 209a-209n and ports 210a-210n. The switch logic 202 may be implemented in one or more processing circuits, where a computer readable storage medium is configured to hold instructions for the switch logic 202, as well as various variables and constants to support operation of the switch 106. The switch logic 202 may be implemented as hardware or software. The switch logic 202 forwards packets between the ports 210a-210n as flows defined by the network controller 112 of FIG. 1.

The secure channel 204 connects the switch 106 to the network controller 112 of FIG. 1. The secure channel 204 allows commands and packets to be communicated between the network controller 112 and the switch 106 via the OpenFlow protocol. The secure channel 204 can be implemented in, e.g., an electrical wire, optical fiber or a wireless channel (along with necessary transmit and receive logic at either end). Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The flow table 206 defines supported connection types associated with particular addresses, virtual local area networks or switch ports, and is used by the switch to process data flows received at the switch. A data flow is a sequence of data packets grouped in some manner, e.g., by source and/or destination, or otherwise defined by selected criteria. Each data flow may be mapped to a port and associated queue based on the flow table 206. For example, a data flow is defined as all packets that match a particular header format.

Each entry 211 in the flow table 206 can include one or more rules 212, actions 214, and statistics 216 associated with a particular flow. The rules 212 define each flow, i.e., the packets that are part of the flow, and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the network controller 112 of FIG. 1, and dropping packets of the flow. Entries 211 in the flow table 206 can be added and removed by the network controller 112 of FIG. 1 via the secure channel 204. The network controller 112 of FIG. 1 can pre-populate the entries 211 in the flow table 206. Additionally, the switch 106 can request creation of an entry 211 from the network controller 112 upon receiving a flow without a corresponding entry 211 in the flow table 206.

The buffers 208a-208n provide temporary storage in respective queues 209a-209n for flows as packets are sent between the ports 210a-210n. In a lossless configuration, rather than dropping packets when network congestion is present, the buffers 208a-208n temporarily store packets in the respective queues 209a-209n until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106. Counters may be maintained for each queue and port.

For example, in an OpenFlow switch, each port 210a-210n is attached to a respective queue 209a-209n. In operation, when the switch 106 receives a packet, the switch 106 attempts to match the packet by comparing fields (referred to as "match fields") to corresponding fields in flow entries of each flow table 206. Exemplary match fields include ingress port and metadata fields, as well as header fields such as those described below in reference to FIG. 3. In one embodiment, matching starts at the first flow table and may continue to additional flow tables.

If no match is found, the switch 106 may perform an action based on the switch configuration, e.g., the packet may be forwarded to the controller or dropped. If the packet matches a flow entry in a flow table, the corresponding instruction set is executed based on the flow entry, e.g., the actions field 214. For example, when a packet is matched to a flow entry including an output action, the packet is forwarded to one of ports 210a-210n specified in the flow entry.

In one embodiment, forwarding the packet to a port includes mapping packets in a flow to a queue attached to the port. Such flows are treated according to the queue's configuration.

Figure 3:
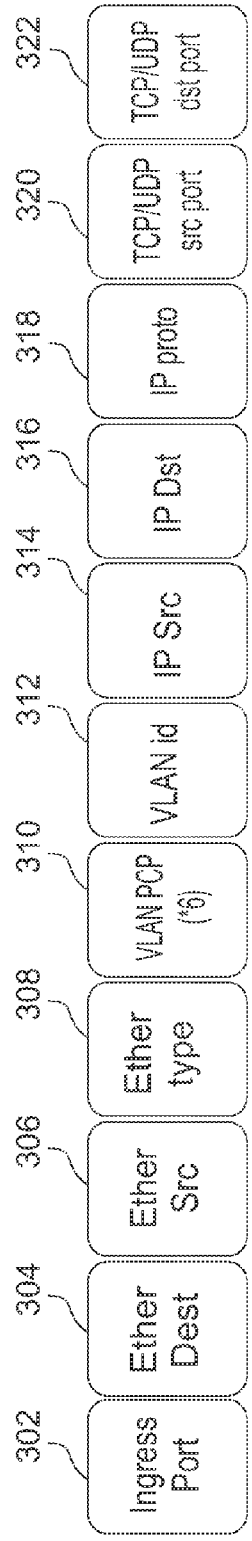
FIG. 3 depicts an example of an OpenFlow flow switching definition that can be used in embodiments.

FIG. 3 depicts an example of an OpenFlow flow definition 300 that can be used in embodiments. The OpenFlow flow definition 300 is a packet header that defines the flow and includes a number of fields. In this example, the flow definition 300 is a flow header that includes up to eleven fields; however, not all fields need to be defined depending upon particular flows. In the example of FIG. 3, the OpenFlow flow definition 300 includes fields for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, and a TCP/UDP destination port 322. The Ethernet destination address 304 may represent a layer-2 Ethernet hardware address or media access control (MAC) address used in legacy switching. The IP destination address 316 may represent a layer-3 IP address used in legacy routing. Flow switching can be defined for any combination of fields in the OpenFlow flow switching definition 300, with a particular combination of fields serving as a key. For example, flows can be defined in a rule 212 of FIG. 2 by exact matching or wildcard matching for aggregated MAC-subnets, IP-subnets, ports, VLAN identifiers, and the like.

Figure 4:
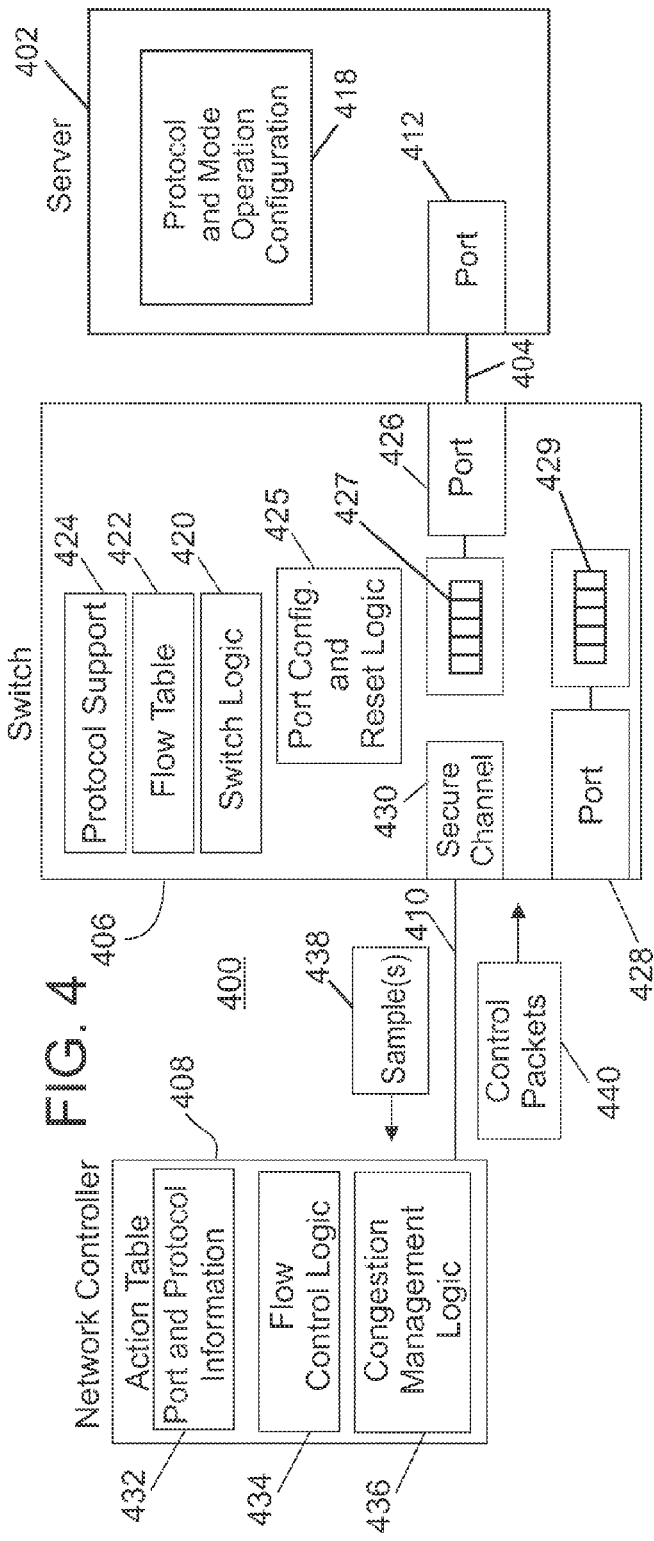
FIG. 4 depicts an exemplary embodiment of a portion of a network including a network switch and a network controller.

FIG. 4 depicts a block diagram of a network portion 400. A server 402 is coupled by a link 404 to a switch 406. An exemplary server 402 is a server 102 of FIG. 1, and an exemplary switch 406 is a switch 106 of FIG. 1. A controller 408 (e.g., a network controller) is linked to the switch 406 by, e.g., a secure link 410. In one embodiment, in OpenFlow-capable environments, the controller is a network controller such as network controller 112 of FIG. 1. In other embodiments, for non-OpenFlow environments, functions of the controller 408 can be integrated into other network entities such as the server 402 or server 102. Although only a single switch 406 is shown in the embodiment of FIG. 4, it is to be understood that the switch 406 may be a plurality of switches connected, e.g., to a central controller 408.

As shown in FIG. 4, the switch 406 is connected to the server 402, which includes at least one port 412 and various logical components such as protocol and mode of operation configuration 418. Logical components described herein can be implemented in instructions stored in a computer readable storage medium for execution by a processing circuit or in hardware circuitry, and can be configured to send frames such as link initialization frames and data packets. The switch 406, server 402 and controller 408 may support a number of modes of operation including, but not limited to, Ethernet, Fibre Channel, Fibre Channel over Ethernet (FCoE), Internet Wide Area Remote direct memory access Protocol (iWARP), and Remote direct memory access over Converged Ethernet (RoCE).

The switch 406 includes switch logic 420, flow table 422, protocol support 424, port configuration and reset logic 425 and multiple ports, such as port 426 for communicating with the server 402 and port 428 for communicating with other network entities such as other switches or servers. The ports may be physical ports, virtual ports defined by the switch, and/or a virtual port defined by the OpenFlow protocol. Each port is attached or connected to a queue that holds data packets for a data flow when there is an imbalance between input rates and output rates of the data flow through the switch. For example, port 426 is attached to a queue 427 and port 428 is attached to a queue 429. When implemented as an OpenFlow switch, the switch 406 also includes a secure channel 430 for communicating with the network controller 408 on secure link 410.

The network controller 408 includes an action table 432 that holds port and protocol information for one or more switches, such as the switch 406 and/or the switches 106, as well as rules, actions, and statistics for flows through the switch 406 and other switches, such as switches 106 of FIG. 1. The network controller 408 also includes flow control logic 434 that can be implemented in instructions stored in a computer readable storage medium for execution by a processing circuit or in hardware circuitry. The network controller 408 can manage updates of the flow table 422 in the switch 406. Based on the updating of the flow table 422, the port and protocol information in the action table 432 of the network controller 408 is updated to reflect the changes.

As indicated above, the network controller 408 communicates with the switch 406 via a secure link 410 established using a specified port, such as a port in a physical network controller 112 or a controller implemented in other processors, such as a server 102 or client system 104. The network controller 408 communicates with the switch 406 to configure and manage the switch, receive events from the switch and send packets out the switch. Various message types can be sent between the switch and the controller to accomplish such functions, including controller-to-switch, asynchronous and symmetric messages.

Controller-to-switch messages are initiated by the controller 408 and may or may not require a response from the switch 406. Features messages are used to request the capabilities of the switch 406 (e.g., upon establishment of the secure link), in response to which the switch 406 should return a features reply that specifies the capabilities of the switch 406. Configuration messages are sent by the controller 408 to set and query configuration parameters in the switch 406. The switch 406 only responds to a query from the controller 408. Modify-State messages are sent by the controller 408 to manage state on the switches, e.g., to add/delete and/or modify flows/groups in the flow table 422 and to set switch port properties. Read-State messages are used by the controller to collect statistics from the switch. Packet-out messages are used by the controller to send packets out of a specified port on the switch, and to forward packets received via Packet-in messages. Packet-out messages contain a full packet or a buffer ID referencing a packet stored in the switch. Packet-out messages also contain a list of actions to be applied in the order they are specified; an empty action list drops the packet.

Asynchronous messages are sent without the controller 408 soliciting them from the switch 406. The switch 406 sends asynchronous messages to the controller 408 to, e.g., denote a packet arrival, switch state change, or error. A packet-in event message may be sent to the controller 408 from the switch 406 for packets that do not have a matching flow entry, and may be sent from the controller 408 to the switch 406 for packets forwarded to the controller 408. Flow-removed messages are used to indicate that a flow entry has been removed due to, e.g., inactivity or expiration of the flow entry. Port-status messages are sent in response to changes in port configuration state and port status events. Error messages may be used by the switch 406 to notify the controller 408 of problems.

Symmetric messages are sent without solicitation, in either direction. Hello messages may be exchanged between the switch 406 and controller 408 upon connection startup. Echo request/reply messages can be sent from either the switch 406 or the controller 408, and can be used to measure the latency or bandwidth of a controller-switch connection, as well as verify its liveness. Experimenter messages provide a way for the switch 406 to offer additional functionality within the OpenFlow message type space.

The controller 408 includes a congestion management feature or capability that is provided to monitor data flows in one or more network switches, e.g., the switch 406 or other Open-Flow enabled switches, estimate congestion within switches and/or switch ports, and adjust flow controls based on the congestion. The controller 408 may perform this function in parallel for a plurality of switches.

Based on control packets and/or configuration information sent to the switch 406 from the controller 408, the switch 406 is configured to sample one or more queues, e.g., the queues 427 and/or 429. The queues may be sampled in response to specific requests from the controller 408 and/or based on sampling instructions associated with selected ports/queues or selected data flows. Queue sampling may be implemented via, the flow table 422, the switch logic 420 and/or port configuration logic 425. In one embodiment, the switch 406 is configured to encapsulate queue information retrieved based on the sampling in a control packet (e.g., sample packet(s) 438) and send the control packet to the controller 408 for analysis.

This feature may be implemented in the controller 408 via, e.g., congestion management logic 436 that requests queue samples 438 and/or configures sampling in the switch 406, and analyzes the samples (i.e., queue information) to determine a level of congestion in the switch 406 and/or in a port in the switch such as port 426 and/or 428. If the level of congestion is above a selected or desired level, the controller 408 may address the congestion, e.g., by rate-limiting an associated data flow at its source (a physical or virtual source) or sending a control data packet 440 to the switch 406 to re-route the associated data flow to another port/path. Exemplary queue information includes queue depth information (e.g., available queue space and/or current queue depth) and rates of change in the queue depth.

Figure 5:
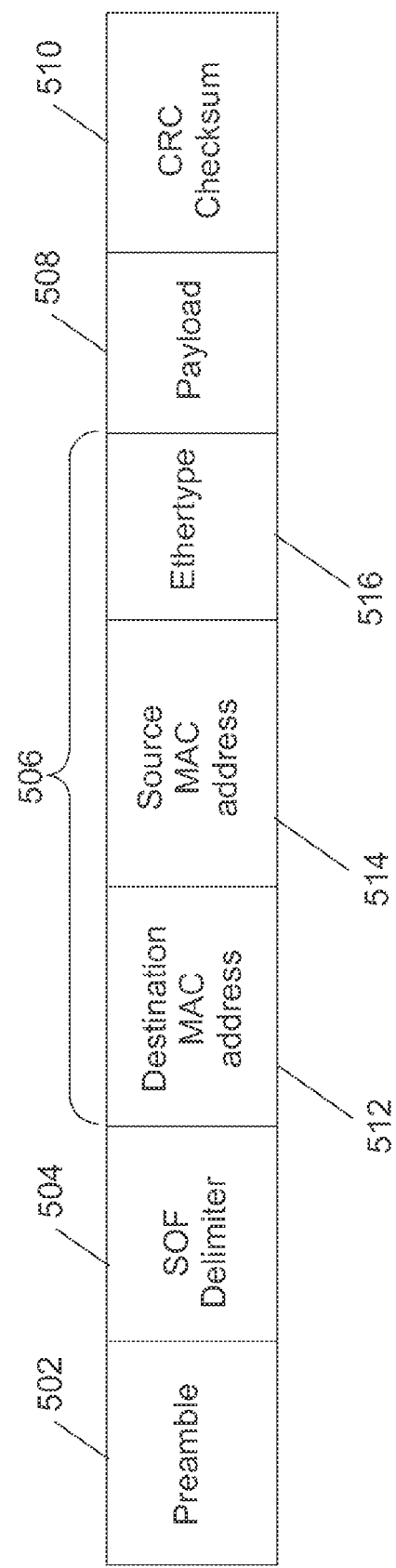
FIG. 5 depicts an example of a control packet sent between a controller and a switch, such as the controller and the switch of FIG. 4.

FIG. 5 depicts an embodiment of a control data frame or control packet 500 used to send data between the controller 408 and the switch 406. The control packet may be used by the controller 408 to communicate with the switch 406 to, e.g., configure and manage the switch and flow tables, send data packets including customer data to the switch, and manage packet routing through the switch. Exemplary control packets include controller-to-switch, asynchronous and symmetric messages as described above. The control packet 500 may be used by the controller 408 to request queue samples or configure the switch 406 to take samples. The control packet 500 may also be used to send queue information or samples from the switch 406 to the controller 408 and/or send controls to the switch 406 based on the queue samples.

The frame 500 includes a preamble 502, a start of frame (SOF) delimiter 504, a header 506, payload data 508 and a cyclic redundancy check (CRC) checksum 510. The header 506 includes network address information and protocol information. For example, the frame 500 includes a destination MAC address 512, a source MAC address 514 and an Ethernet type field 516.

It is noted that the frame 500 and the header 506, and their respective fields, are not limited to the specific embodiments described herein. For example, the header 506 may include different or additional fields depending on protocols used. In one example, the header 506 may include any number of fields as described with reference to the switching definition 300.

Figure 6:
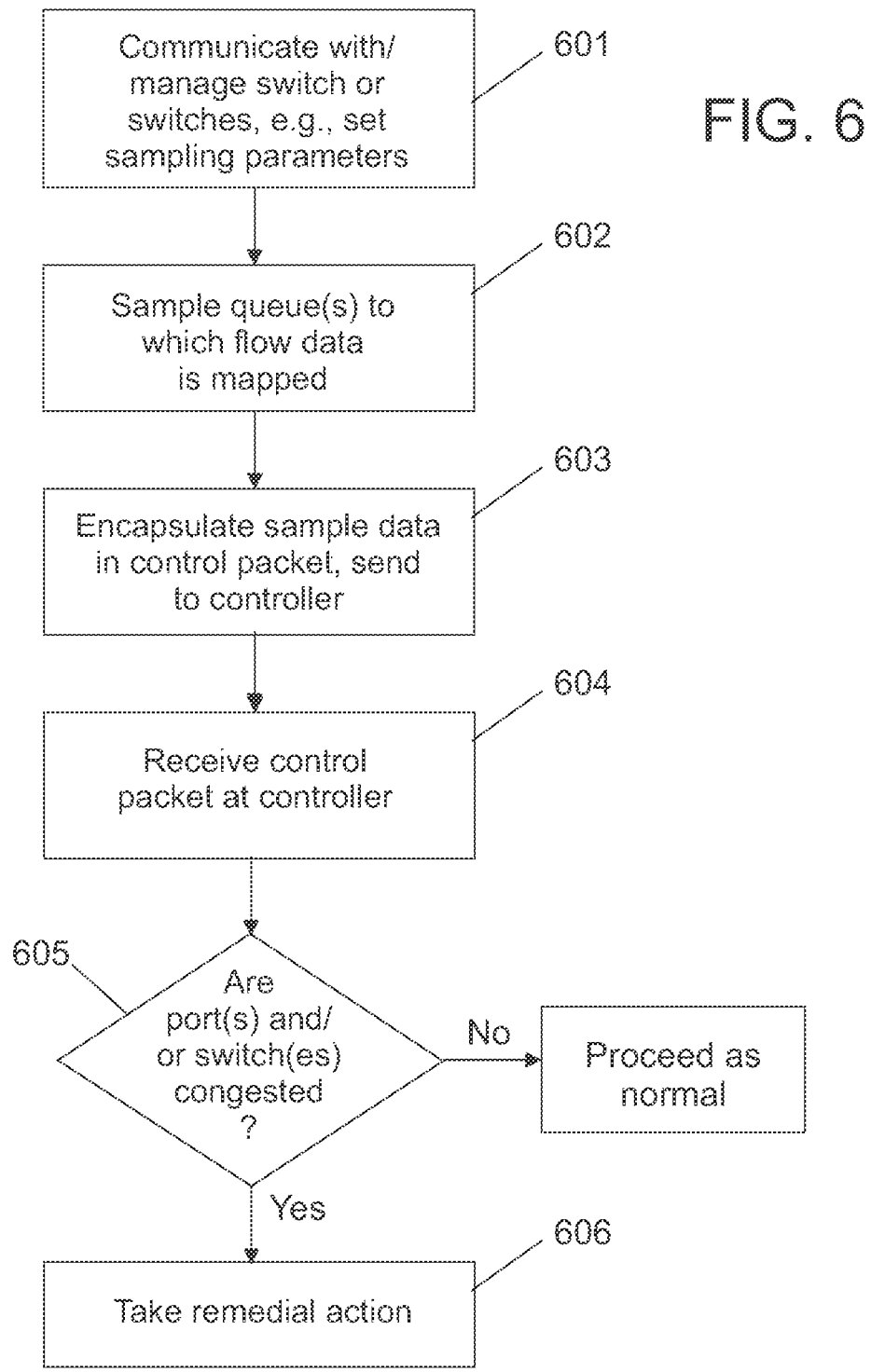
FIG. 6 is a flow diagram showing a method of monitoring a network switch.

An embodiment of a method 600 of communication between a switch and a network controller in a network is described with reference to FIG. 6. The method 600 includes monitoring switches for congestion and/or controlling switches and other components of a network in response to the monitoring. FIG. 6 is a flow diagram illustrating an exemplary embodiment of the method 600. The method 600 is described in conjunction with the network portion 400 shown in FIG. 4, but is not so limited. In one embodiment, the method includes the steps represented by blocks 601-606 in the order described. However, in some embodiments, not all of the steps are performed and/or the steps are performed in a different order than that described.

At block 601, the controller 408 manages switches 406 in a network by initializing switches, populating and/or modifying flow tables to manage flows, sending flows to various switches and communicating with switches in general. In one embodiment, the controller 408 configures the switches 406 to sample queues via one or more control packets such as the control packet 500. For example, the controller 408 sends a configuration message to the switch 406 to set sampling parameters for one or more flows or set sampling parameters for one or more port queues (e.g., queues 209, 427 and/or 429). Sampling parameters may include sample data types (i.e., selected queue statistics), sampling times and/or sampling frequency.

The means by which the switch 406 is configured to sample queues is not limited to the embodiments described herein. The controller 408 may request samples or set sampling configuration in any suitable manner. For example, the controller 408 may send specific commands or requests (e.g., via a control packet) to sample queues. In other examples, the controller 408 sends control packets or messages to configure the flow table 422 to set sampling parameters for selected flow entries, and/or sends messages to the port configuration logic 425 to request samples or set sampling parameters.

At block 602, for one or more data flows being handled by the controller 408, at selected times, the switch 406 samples the queue to which each data flow is mapped (i.e., identified by the flow table). In one embodiment, the switch 406 is configured to take a sample of the queue at various points during which a data flow routing operation is being performed and/or during which data from the data flow is queued in a port.

For example, the controller 408 may query the switch 406 or set sampling parameters for queue data relating to a single queue, multiple queues or all queues in the switch. The switch 406 may return a reply in the form of a control packet that encapsulates the queue information or sample data obtained by sampling the queue.

At block 603, the switch 406 takes a sample of the queue and creates a packet including queue information. In one embodiment, the queue information is encapsulated in a control packet. The control packet is sent to the controller 408. An example of a control packet returned by the switch is packet 500. The queue sample data may be encapsulated in, e.g., the payload field 508. The type of data (e.g., type of queue statistic, identification of queue(s)) may also be included in the payload field 508.

In one embodiment, the sampled queue information includes queue depth information. Such information may include the "current queue depth" (also referred to as queue length, i.e., current queue occupancy in number of frames or byte) and maximum queue depth. "Maximum queue depth" refers to the total space available for a queue. The maximum queue depth could be a fixed allocation per queue, or could be adapted on the fly, e.g., by the network controller. For example, the maximum queue depth can be adjusted by the network controller so that busy queues could be allocated more space at the expense of idle queues.

The queue information may include any suitable or desirable queue statistics In one embodiment, the queue information is associated with a clock or counter attached to the queue, and the queue information includes data indicating current queue depth at multiple times during processing of a data flow.

At block 604, the controller 408 receives one or more control packets including the queue information embodied as sample data. The controller 408, in one embodiment decapsulates the sample data from a control packet 500.

At block 605, the controller analyzes the sample data or queue information to determine whether an associated port is congested or whether congestion is anticipated.

The controller 408 analyzes the queue information to determine whether a condition exists that may require remedial action or is otherwise undesirable. Such a condition may include a congestion condition in which the queue information indicates that the switch and respective port is congested or indicates that an unacceptable congestion level will occur. Other conditions may include unfairness conditions or conditions in which a Service Level Agreement (SLA) is infringed.

In one embodiment, the controller 408 determines whether the queue information indicates a congestion condition. For example, the controller 408 compares the current queue depth to a selected threshold at various times or during various time periods. If the current queue depth is above a selected threshold, a congestion condition is considered to exist.

In one embodiment, the controller 408 analyzes the queue information to determine the rate of change of queue depth, i.e., how fast the queue is filling up. For example, the controller 408 determines the percentage of the queue depth that is filled at multiple times, and calculates the rate at which the queue is filling up. If the rate exceeds a selected threshold, a congestion condition exists. In another embodiment, the congestion condition may be determined based on both the current queue depth in relation to a threshold as well as the rate of change in queue depth.

It is noted that the type of queue information that may be sampled and analyzed is not limited to the embodiments described herein. Any type of information that can be analyzed to determine congestion levels may be used.

At block 606, if the controller 408 determines that a congestion condition exists for a port, the controller 408 may take remedial action to alleviate the congestion or prevent potential congestion. In one embodiment, the controller 408 sends a control packet to the switch 406, and/or sends a control packet or other communication to a source of the data flow. In one embodiment, the controller 408 sends a rate-limiting command to the source to throttle the source or rate-limit the flow. In another embodiment, the controller 408 sends a control packet to the switch 406 to instruct the switch 406 to route the flow to another switch.

An embodiment of a method of load balancing and otherwise managing a network is provided. The load balancing method includes sampling switches or other nodes in a software defined network (SDN), such as the network 100 and/or a network including network portion 400, and adjusting loads in the network in response to detecting congestion conditions based on the sampling. In one embodiment, the method includes steps performed in the order described. However, in some embodiments, not all of the steps are performed and/or the steps are performed in a different order than that described.

In the first step, during routing or other processing of data packets in a network, a load sensor in each of one or more switches (e.g., switches 106 and/or 406) samples flow data such as port queue data and sends sample packets to a load manager configured to control injection rates in physical traffic sources (adapters, network interface controllers (NICs), CNAs) or virtual traffic sources (e.g., virtual NICs (vNICs), virtual machines (VMs), or application layers), and also optionally routing and other functions in each of the switches. For example, the load manager can set transmission rates individually or for a group of source. An exemplary transmission rate setting includes a maximal (upper bound) transmission rate set for each congested data flow In one example, the load sensor includes suitable logic in a switch 406, which may be configured as an OpenFlow switch, and an exemplary load manager is the controller 408. In this example, the load sensor in each of a plurality of switches 406 sends one or more control packets 500 including samples to the controller 408.

The load sensor may be any suitable processor and/or application in a network entity capable of sending sample information to the load manager. An exemplary load sensor is included in a switch configured for quantized congestion control (QCN) monitoring, which is configured to generate a congestion notification (CMN). The load sensor may be any of a variety of types of local load sensors for a switch or other network entity that are configured to transmit sample data and load statistics to the centralized controller. Other examples of load sensors include random early detection (RED) monitors, random early marking (REM) monitors, QCN congestion points, and sFlow monitors.

The centralized load manager may be any suitable processor or entity in a physical and/or virtual network such as a SDN that is configured to receive sample packets and control a plurality of traffic sources (e.g., physical, virtual and/or high or low layer sources), switches or nodes in the network. The load manager may be a logically centralized controller, which could possibly be physically distributed (e.g., in a plurality of subnet managers or OpenFlow managers). The load manager may be, e.g., an internal switch or an external entity. Examples include a distributed overlay virtual network (DOVE) control entity (DOVE Policy Service) or a central network controller such as any centralizing block of a virtual extensible local area network (VXLAN) or a Network Virtualization using Generic Routing Encapsulation (NVGRE) network, or any other equivalent SDN entity. In addition, the load manager may be scalable to control any number of switches and/or other network entities.

In the second step, the load manager, based on the received load sample packets (e.g., CNM feedback), determines whether a condition such as a congestion or unfairness condition occurs and aggregates all the received samples associated with the congestion condition. In one embodiment, the aggregated samples are aggregated over a time period around which congestion is detected (a congestion epoch). The congestion epoch may have any selected length (e.g., about 0.1-1000 ms).

The condition described above may be any condition for which remedial action is required or desired. As indicated above, the condition may be a congestion condition, an unfairness condition and/or a Service Level Agreement (SLA) infringement condition existing in one or more network switches.

The load manager can perform calculations using the received load samples during each congestion epoch. For example, the received load samples can be aggregated over time and/space. For example, samples may be aggregated for a selected time period such as the congestion epoch or portion thereof. In another example, samples may be aggregated based on switch location, e.g., for all switches or entities in a network or selected portion of a network, or for adjacent or proximately located switches such as switches in a data center.

The congestion, unfairness and/or SLA infringement condition may be determined based on calculating any number of network or performance parameters. Exemplary parameters include a number of culprit flows (e.g., flows sampled "hot", e.g., causing an unacceptable build-up in input queues), severity (e.g., congestion severity), positions of culprit flows, data flow velocities, fair future rates, deviations from SLAs, and histories of measured loads (e.g., congestive loads).

In the third step, the load manager centrally calculates a new globally fair transmission (Tx) rate for all affected flows based on the number of affected flows and the congestion severity. For example, for a QCN-enabled network, the congestion severity is calculated as a function of the offset (Qoff) from an equilibrium queue length and the rate of growth of a queue (Qdelta).

As indicated above, the load manager and load sensors described herein are not limited to the specific embodiments described herein, but may be any suitable entities capable of sending samples and centrally controlling network flow based on load statistics or congestion calculations. For example, the load balancing method may be used in networks utilizing random early detection (RED) congestion control, random early marking (REM) congestion control, sFlow monitoring, NetFlow monitoring, OpenStack monitoring or OpenFlow as described above.

In the fourth step, the load manager (LM) sends, e.g., via multicast, a global load or congestion control message to all data flow sources connected to the network, or at least to all of the data flow sources or traffic sources of the flows responsible for the congestion condition (referred to herein as culprits). In one embodiment, a "global" message refers to a message sent from the LM to all of the culprit sources. The culprit traffic sources can be physical points (e.g., reaction points (RP)), virtual entities (e.g., vNICs) and/or application VMs. Alternatively, in addition or instead of the global control message, the LM can also send customized unicast load control messages to each individual flow source.

In one embodiment, the control message is sent simultaneously or quasi-simultaneously (e.g., within a tight time interval that is much smaller than a congestion epoch) to all culprits to set their new transmission rate. The control message may be sent, e.g., by multicast or a series of unicasts. For example, the control message may be sent quasi-simultaneously by a series of unicast messages or by multi-cast messages within a time interval that is shorter than the congestion epoch, e.g., at least 10 times shorter than the congestion epoch. By reaching the involved culprits relatively simultaneously, a multicast transmission per epoch can increase the fairness of load balancing in the network. In one embodiment, the control message is sent quasi-simultaneously via a multicast to the culprits. In this embodiment, there is no need for the load manager to synchronize anything, as the multicast inherently performs synchronization and may also include a fairness feature.

In one embodiment, the load manager can send individual control messages to each culprit flow source. For example, the load manager can issue a series of unicast signals with per-source specific controls (e.g., the new transmission rate is individualized).

Technical effects include the ability for early detection of congestion or detection of conditions that may lead to overload or unfairness problems. The method provides an early indicator of congestion, allowing the controller to take global action fairly and potentially before congestion becomes a problem. In addition, detection of congestion conditions may be performed without the need to synchronize clocks in the switches that are monitored. The only relaxed (quasi) synchronicity requirement is imposed upon sending the next global control signal from LM to all the involved flow sources within a relatively tight time interval (i.e., smaller than the congestion epoch). However, the one or more monitored switches need not be synchronized, as each of their queues may inform about distinct hotspot/overload events.

Furthermore, embodiments described herein provide a centralized load balancing system that provides for congestion feedback to be sent to a centralized controller, allowing for centralized management of loads in a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of monitoring transmission of data in a network, comprising:
    receiving data packets for one or more data flows by at least one of a plurality of network switches;
    sampling queue data in each of the plurality of network switches receiving the one or more data packets, the sampled queue data taken from at least one queue attached to a switch port to which the one or more data packets have been forwarded, wherein the sampling of queue data from the switch port is performed by the network switch that has the switch port;
    encapsulating, by the network switch that performs the sampling, the sampled queue data in a control packet configured for communication between the plurality of network switches and a logically centralized network controller, the control packet configured to be used by the network controller to control switch configuration and routing; and
    transmitting the control packet including the sampled queue data by each network switch to the network controller connected to the plurality of switches, the network controller configured to control the plurality of network switches, the network controller configured to determine whether a congestion, unfairness or Service Level Agreement (SLA) infringement condition exists in one or more switches based on the sampled queue data, the network controller configured to select a time period during which the congestion, unfairness or SLA infringement condition was detected, aggregate all of the sampled queue data that was sampled during the time period, and send a control message to all data flow sources responsible for the congestion, unfairness or SLA infringement condition, the control message setting a globally fair transmission rate for all data flows for which the congestion, unfairness or SLA condition was detected, the control message sent to each of the data flow sources so that all of the data flow sources responsible for the congestion, unfairness or SLA infringement condition receive the control message within a time interval that is smaller than the time period.

2. The method of claim 1, wherein the globally fair transmission rate is calculated based on a number of data flows affected by the congestion, unfairness or SLA condition, and based on a severity of the congestion, unfairness or SLA condition.

3. The method of claim 1, wherein the network controller is configured to determine whether the congestion, unfairness or SLA infringement condition exists based on a rate of change of depth of the at least one queue, the depth corresponding to an amount of the at least one queue that is filled with data.

4. The method of claim 1, further comprising receiving the control message from the network controller by the at least one of a plurality of network switches, wherein the control message is a global control message sent to each of the plurality of network switches based on aggregated sampled queue data from the plurality of network switches for a selected time period, the global control message including rate control calculated based on the aggregated sampled queue data.

5. The method of claim 1, wherein transmitting the sampled queue data includes sending the sample data packet to the network controller over a secure link, the secure link established by the network controller to configure the switch and establish communication properties of links between network switches.

6. A method of monitoring transmission of data in a network, comprising:
- receiving, by a centralized network controller, a control packet encapsulating sampled queue data from each of a plurality of network switches, the network controller configured to control the plurality of network switches, the sampled queue data taken from at least one queue attached to a switch port to which one or more data packets of a data flow have been forwarded, the sampling of queue data from the switch port performed by the network switch that has the switch port, the control packet configured to be used by the network controller to control switch configuration and routing;
- determining, by the network controller, whether a congestion, unfairness or Service Level Agreement (SLA) infringement condition exists in one or more network switches for one or more data flows based on the sampled queue data; and
- based on determining that the congestion, unfairness or SLA infringement condition exists for the one or more data flows, selecting a time period during which the congestion, unfairness or SLA infringement condition was detected, aggregating all of the sampled queue data that was sampled during the time period and sending a control message via a control packet to all data flow sources responsible for the congestion, unfairness or SLA infringement condition to reduce an amount of congestion, unfairness or SLA non-compliance in the network switch, the control message setting a globally fair transmission rate for all data flows for which the congestion, unfairness or SLA condition was detected, the control message sent to each of the data flow sources so that all of the data flow sources responsible for the congestion, unfairness or SLA infringement condition receive the control message within a time interval that is smaller than the time period.

7. The method of claim 6, wherein the plurality of network switches is a plurality of OpenFlow switches and the network controller is an OpenFlow network controller.

8. The method of claim 6, wherein the plurality of network switches are configured for quantized congestion control (QCN) monitoring, which is configured to generate a congestion notification message (CNM).

9. The method of claim 6, wherein the control message is sent via a multicast message to each of the plurality of data flow sources within the time interval.

10. The method of claim 6, wherein determining includes aggregating sampled queue data for each data flow over a congestion epoch, and determining whether the congestion, unfairness or SLA infringement condition exists based on a number of congested data flows and at least one of congestion severity, an unfairness severity and a SLA infringement severity.

11. The method of claim 10, wherein the control message includes a transmission rate set for each congested data flow.

12. The method of claim 6, wherein sending the control message includes sending the control message to a plurality of data flow sources via a multicast function.

13. The method of claim 6, wherein the control message includes a transmission rate that is set individually for each of the one or more data flow sources.

14. An apparatus for controlling a plurality of switches in a network, comprising:
- a memory having computer readable computer instructions; and
- a processor for executing the computer readable instructions, the instructions including:
  - receiving a control packet encapsulating sampled queue data from each of a plurality of network switches, the sampled queue data taken from at least one queue attached to a switch port to which one or more data packets of a data flow have been forwarded, the sampling of queue data from the switch port performed by each of the plurality of network switches that has the switch port, the control packet configured to be used to control switch configuration and routing;
  - determining whether a congestion, unfairness or Service Level Agreement (SLA) infringement condition exists in one or more network switches for one or more data flows based on the sampled queue data; and
  - based on determining that the congestion, unfairness or SLA infringement condition exists for the one or more data flows, selecting a time period during which the congestion, unfairness or SLA infringement condition was detected, aggregating all of the sampled queue data that was sampled during the time period, and sending a control message via a control packet to all data flow sources responsible for the congestion, unfairness or SLA infringement condition to reduce an amount of congestion, unfairness or SLA non-compliance in the network, the control message setting a globally fair transmission rate for all data flows for which the congestion, unfairness or SLA condition was detected, the control message sent to each of the data flow sources so that all of the data flow sources responsible for the congestion, unfairness or SLA infringement condition receive the control message within a time interval that is smaller than the time period.

15. The apparatus of claim 14, wherein the network is a Software Defined Network (SDN).

16. The apparatus of claim 14, wherein determining includes aggregating sampled queue data for each data flow over a congestion epoch, and determining whether the congestion, unfairness or SLA infringement condition exists based on a number of congested data flows and at least one of congestion severity, an unfairness severity and a SLA infringement severity.

17. The apparatus of claim 16, wherein the control message includes a maximal (upper bound) transmission rate set for each congested data flow.

18. The apparatus of claim 14, wherein sending the control message includes sending the control message to each source via one of a multicast and a unicast.

19. The apparatus of claim 14, wherein the control message is sent to a plurality of data flow sources within a time period that is less than a time period around which the congestion, unfairness or SLA infringement condition was detected.

20. A computer program product for monitoring transmission of data in a network, the computer program product comprising:
- a non-transitory tangible storage medium readable by a processing circuit and storing instructions for execution by the processing circuit for performing a method comprising:
  - receiving a control packet encapsulating sampled queue data from each of a plurality of network switches at a centralized network controller configured to control the plurality of network switches, the sampled queue data taken from at least one queue attached to a switch port to which one or more data packets of a data flow have been forwarded, the sampling of queue data from the switch port performed by each of the plurality of network switches that has the switch port, the control packet configured to be used by the network controller to control switch configuration and routing;

determining whether a congestion, unfairness or Service Level Agreement (SLA) infringement condition exists in one or more network switches for one or more data flows based on the sampled queue data; and based on determining that a congestion, unfairness or SLA infringement condition exists for the one or more data flows, selecting a time period during which the congestion, unfairness or SLA infringement condition was detected, aggregating all of the sampled queue data that was sampled during the time period, and sending a control message via a control packet to all data flow sources responsible for the congestion, unfairness or SLA infringement condition to reduce an amount of congestion, unfairness or SLA non-compliance in the one or more network switches, the control message setting a globally fair transmission rate for all data flows for which the congestion, unfairness or SLA condition was detected, the control message sent to each of the data flow sources so that all of the data flow sources responsible for the congestion, unfairness or SLA infringement condition receive the control message within a time interval that is smaller than the time period.

21. The computer program product of claim 20, wherein determining includes aggregating sampled queue data for each data flow over a congestion epoch, and determining whether the congestion, unfairness or SLA infringement condition exists based on a number of congested data flows and at least one of congestion severity, an unfairness severity and a SLA infringement severity.

22. The computer program product of claim 21, wherein the control message includes a maximal (upper bound) transmission rate set for each congested data flow.

23. The computer program product of claim 20, wherein the control message is sent to a plurality of data flow sources within a time period that is less than a time period around which the congestion, unfairness or SLA infringement condition was detected.

24. A computer program product for monitoring transmission of data in a network, the computer program product comprising:

a non-transitory tangible storage medium readable by a processing circuit and storing instructions for execution by the processing circuit for performing a method comprising:

receiving data packets for one or more data flows by at least one of a plurality of network switches;

sampling queue data in each of the plurality of network switches receiving the one or more data flows, the sampled queue data taken from at least one queue attached to a switch port to which the one or more data packets have been forwarded, wherein the sampling of queue data from the switch port is performed by each of the plurality of network switches that has the switch port;

encapsulating, by the network switch that performs the sampling, the sampled queue data in a control packet configured for communication between the plurality of network switches and a logically centralized network controller, the control packet configured to be used by the network controller to control switch configuration and routing; and transmitting the control packet including the sampled queue data by each network switch to the network controller connected to the plurality of switches, the network controller configured to control the plurality of network switches, the network controller configured to determine whether a congestion, unfairness or Service Level Agreement (SLA) infringement condition exists in one or more switches based on the sampled queue data, the network controller configured to select a time period during which the congestion, unfairness or SLA infringement condition was detected, aggregate all of the sampled queue data that was sampled during the time period, and send a control message to all data flow sources responsible for the congestion, unfairness or SLA infringement condition, the control message setting a globally fair transmission rate for all data flows for which the congestion, unfairness or SLA condition was detected, the control message sent to each of the data flow sources so that all of the data flow sources responsible for the congestion, unfairness or SLA infringement condition receive the control message within a time interval that is smaller than the time period.

25. The method of claim 24, wherein the plurality of network switches is a plurality of OpenFlow switches and the network controller is an OpenFlow network controller.

* * * * *